US009832277B2

(12) United States Patent
Misra et al.

(10) Patent No.: US 9,832,277 B2
(45) Date of Patent: Nov. 28, 2017

(54) SYSTEMS AND METHODS FOR ADAPTIVE PARTITIONING IN DISTRIBUTED CACHE MEMORIES

(71) Applicant: HGST Netherlands B.V., Amsterdam (NL)

(72) Inventors: Pulkit Ambikanandan Misra, Durham, NC (US); Daniel Peter Noé, Littleton, MA (US)

(73) Assignee: Western Digital Technologies, Inc., San Jose, CA (US)

( * ) Notice: Subject to any disclaimer, the term of this patent is extended or adjusted under 35 U.S.C. 154(b) by 199 days.

(21) Appl. No.: 14/941,125

(22) Filed: Nov. 13, 2015

(65) Prior Publication Data
US 2017/0142217 A1 May 18, 2017

(51) Int. Cl.
G06F 15/167 (2006.01)
H04L 29/08 (2006.01)
G06F 12/0813 (2016.01)
G06F 12/084 (2016.01)
H04L 29/06 (2006.01)

(52) U.S. Cl.
CPC ........ H04L 67/2842 (2013.01); G06F 12/084 (2013.01); G06F 12/0813 (2013.01); H04L 67/1097 (2013.01); H04L 67/40 (2013.01); G06F 2212/1024 (2013.01); G06F 2212/154 (2013.01); G06F 2212/604 (2013.01)

(58) Field of Classification Search
CPC ............. H04L 67/2842; G06F 12/0813; G06F 12/084; G06F 2212/1024; G06F 2212/154; G06F 2212/604
See application file for complete search history.

(56) References Cited

U.S. PATENT DOCUMENTS

| 6,711,571 | B2 | 3/2004 | Putzolu |
| 6,754,220 | B1 | 6/2004 | Lamberton et al. |
| 6,792,509 | B2 | 9/2004 | Rodriguez |
| 7,069,324 | B1 * | 6/2006 | Tiwana ............... G06F 12/0806 709/215 |
| 7,277,897 | B2 | 10/2007 | Bamford et al. |
| 7,461,146 | B2 | 12/2008 | Koning et al. |
| 8,429,346 | B1 | 4/2013 | Chen et al. |
| 8,443,138 | B2 | 5/2013 | Kumano et al. |
| 8,477,597 | B2 | 7/2013 | Zhang et al. |
| 8,984,162 | B1 * | 3/2015 | Allen .................... G06F 13/385 709/242 |

(Continued)

OTHER PUBLICATIONS

Morera et al., "Robust router reconfiguration in large dynamic networks," *Military Communications Conference*, MILCOM '03. 2003 IEEE, vol. 2, pp. 1343-1347 (2003) vol. 2, Oct. 13-16, 2003.

*Primary Examiner* — Jonathan Bui
(74) *Attorney, Agent, or Firm* — McDermott Will & Emery LLP

(57) ABSTRACT

Methods and systems for performing adaptive partitioning of a distributed cache partitioned in cache slices are provided. The slices of the distributed cache are assigned to different computer nodes of the cluster based on a routing table. After a pre-determined period of time, the cache slices can be re-assigned to other computer nodes of the cluster based on access statistics and a new routing table is provided that corresponds to the re-assignment of the cache slices to the computer nodes of the cluster.

24 Claims, 4 Drawing Sheets

(56) References Cited

U.S. PATENT DOCUMENTS

| | | | | |
|---|---|---|---|---|
| 2004/0215883 A1* | 10/2004 | Bamford | ............ | G06F 17/3048 |
| | | | | 711/129 |
| 2005/0015554 A1* | 1/2005 | Zohar | ................... | G06F 3/0607 |
| | | | | 711/119 |
| 2006/0123197 A1* | 6/2006 | Dunshea | ............ | G06F 12/0864 |
| | | | | 711/118 |
| 2007/0079073 A1* | 4/2007 | Rosenbluth | ......... | G06F 9/30047 |
| | | | | 711/134 |
| 2009/0049248 A1* | 2/2009 | Clark | ................. | G06F 12/0851 |
| | | | | 711/129 |
| 2009/0172690 A1* | 7/2009 | Zimmer | ................ | G06F 9/5077 |
| | | | | 718/104 |
| 2010/0042792 A1* | 2/2010 | Sandler | .............. | G06F 11/2076 |
| | | | | 711/162 |
| 2012/0005524 A1* | 1/2012 | Rangarajan | ......... | G06F 11/1658 |
| | | | | 714/6.1 |
| 2012/0324069 A1* | 12/2012 | Nori | ................... | H04L 41/0806 |
| | | | | 709/222 |
| 2013/0041972 A1* | 2/2013 | Field | ................ | H04L 29/08729 |
| | | | | 709/213 |
| 2015/0039784 A1* | 2/2015 | Westphal | ............. | H04L 45/306 |
| | | | | 709/240 |
| 2016/0283374 A1* | 9/2016 | Pal | ........................ | G06F 12/084 |
| 2017/0116118 A1* | 4/2017 | Artieri | ................. | G06F 12/084 |
| 2017/0124000 A1* | 5/2017 | Ash | ...................... | G06F 12/128 |

* cited by examiner

SYSTEMS AND METHODS FOR ADAPTIVE PARTITIONING IN DISTRIBUTED CACHE MEMORIES

FIELD OF THE DISCLOSURE

The present disclosure relates to systems and methods for adaptive partitioning of distributed cache or storage memory.

RELATED DISCLOSURE

Computer clusters consist of two or more computer nodes that can be interconnected through a network. Computer clusters can implement distributed storage memory systems, e.g., distributed cache systems. The total storage capacity of the cluster is typically divided into a number slices of some standard size. The slices are distributed across the computer nodes of the cluster. Each slice can be local to one and only one computer node. Any request at a computer node for a logic block address (LBA) that resides in a slice that is owned by a remote computer node needs to be sent over the network for processing on the remote node.

This can increase the traffic on the network, which can deteriorate the network bandwidth and the latency because of network contention. Accordingly, systems and methods for appropriately distributing the slices are desirable, that can decrease the impact of remote data requests to the network performance.

SUMMARY

Methods and systems for performing adaptive partitioning of a distributed cache partitioned in cache slices are provided. The slices of the distributed cache are assigned to different computer nodes of the cluster based on a routing table. After a pre-determined period of time, the cache slices can be re-assigned to other computer nodes of the cluster based on access statistics and a new routing table is provided that corresponds to the re-assignment of the cache slices to the computer nodes of the cluster.

According to aspects of the disclosure, a method is provided for adaptive partitioning of a distributed cache in a cluster comprising a plurality of computer nodes interconnected by a network, the distributed cache partitioned in cache slices. The method can comprise the steps of assigning a first plurality of cache slices to a first computer node based on a first routing table, re-assigning, after a first period of time, based on access statistics for the cache slices of the computer nodes, a second plurality of cache slices to the first computer node and a first subset of the first plurality of cache slices to at least one computer node other than the first computer node, and providing a second routing table according to assignments of cache slices to the computer nodes after the first period of time.

According to aspects of the disclosure, a system is provided for adaptive partitioning of a distributed cache in a cluster comprising a plurality of computer nodes interconnected by a network. The system can comprise a distributed cache partitioned in cache slices and a first computer node. The first computer node can be configured to assign a first plurality of cache slices to the first computer node based on a first routing table, re-assign, after a first period of time, based on access statistics for the cache slices of the computer nodes, a second plurality of cache slices to the first computer node and a first subset of the first plurality of cache slices to at least one computer node other than the first computer node, and provide a second routing table according to assignments of cache slices to the computer nodes after the first period of time.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

Systems and methods for adaptive partitioning of distributed cache systems are disclosed. The total cache of the cluster is divided into a number slices, which are associated with the computer nodes of the cluster. The disclosed systems and methods examine the network utilization of the cluster and can re-assign the slices to new computer nodes. A new routing map representing the new assignments can be routed to every computer node of the cluster.

Figure 1:
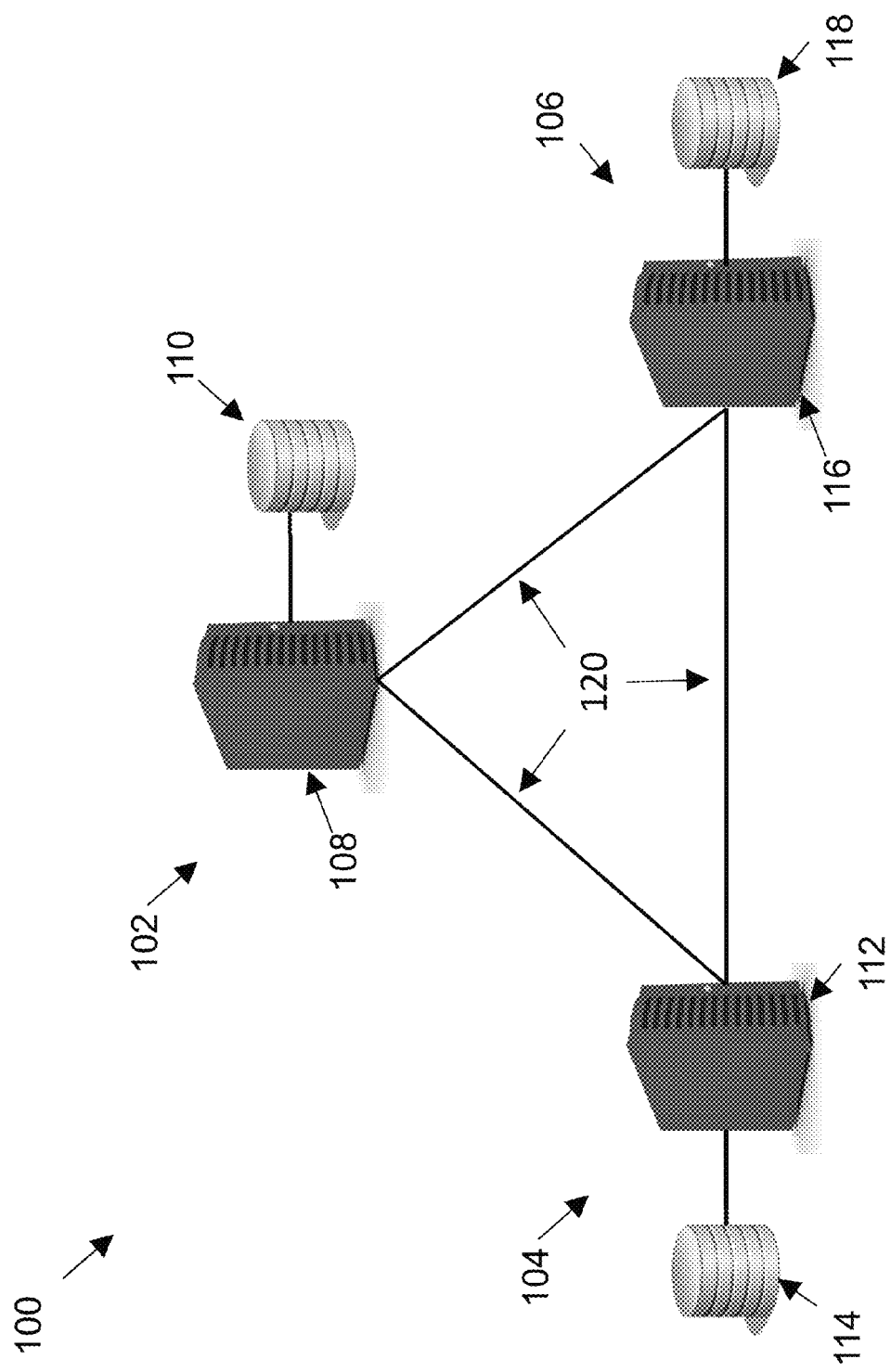
FIG. 1 illustrates an exemplary cluster system, according to aspects of the disclosure.

FIG. 1 shows an exemplary cluster 100 of computer nodes. Specifically, cluster 100 contains computer nodes 102, 104, and 106. Node 102 includes server 108 and storage device 110, Node 104 includes server 112 and storage device 114, and Node 106 includes server 116 and storage device 118. Nodes 102, 104, and 106 are interconnected through network 120. Some prior art distributed storage systems typically distribute slices across computer nodes through striping. The data striping technique stores logically sequential slices on physical storage devices of different computer nodes, e.g., through a round-robin fashion. For example, the slices in cluster 100 can be consecutively be assigned to nodes 102, 104, and 106 in this order. Other prior art distributed storage systems can randomly distribute the slices among the nodes of the cluster, e.g., using a hash function.

These prior art systems exhibit poor scalability. For example, assuming a random and uniform distribution of slices among "N" nodes in a cluster, the probability of requested data packet from a server of a particular node being stored locally to the node is only 1/N. If the requested data packet is not stored locally, then a request for the data packet needs to be sent over the network to the remote node and the data packet needs to be transferred over the network to the node that requested it. As the number of nodes grows, an increasing number of data packets must be transferred over the network to satisfy data packet requests. This can have a negative impact on the available bandwidth of the network. Since upper layer applications can also be trying to compete for network bandwidth, the system can have poor performance due to network congestion.

Without prior knowledge about accesses, as discussed above, the slices can be initially striped across all the nodes in the cluster. Each node can have a routing map with the information about every slice ownership in the cluster, which can be used to route a request to appropriate an owner. Each node can also maintain access statistics for all the slices. The data structure for storing this information can be an array that can be sized according to the number of slices and can also have a field in the array for a timestamp. The slice number can be implied from the array index and each index in the array can indicate access statistic for that slice, e.g., the amount of data that was read and/or written to that particular slice from that node. A timestamp can be stored for the entire data structure so that the data rate (MB/sec) can be easily calculated for the interval since last reset of the information in the data structure.

Whenever a particular node receives a request for a logic block address (LBA), it can determine the slice to which the LBA belongs to and then can consult the routing map to determine the owner node of that particular slice. If the particular node is the owner of the particular slice then it can service the request locally, without consuming any network resources. If the particular slice is owned by another node, the request is routed to that owner. The particular node, can also modify the access statistic counter for that slice accordingly.

According to aspects of the disclosure, after a pre-determined time period, the disclosed systems and methods can determine new owners for each slice, that could reduce the network utilization. The new owners can be determined after the pre-determined time period, in which sufficient information about access statistics has been collected, to inform the decision about the new owners. If the disclosed method determines that a slice can change to a new owner, it can be dynamically reassigned, e.g., without user intervention or the requirement to recreate the cache.

Since more than one node can access data within the same slice, after a slice is re-assigned to a new owner, other nodes may still require to access the slice remotely. Accordingly, the network still should accommodate requests for data access in remote nodes. According to aspects of the disclosure, a slice can be re-assigned to a node based on locality of access, e.g., to the node that transfers the most data, which can result in minimizing the effect on the network.

In addition to the network utilization reduction, the dynamic allocation of slices can also improve scalability, because it can allow the addition of more computer nodes into the cluster. The disclosed systems and methods can also better adapt to changes in access patterns, for example, in case of new applications, application failures, or for load balancing.

Figure 2:
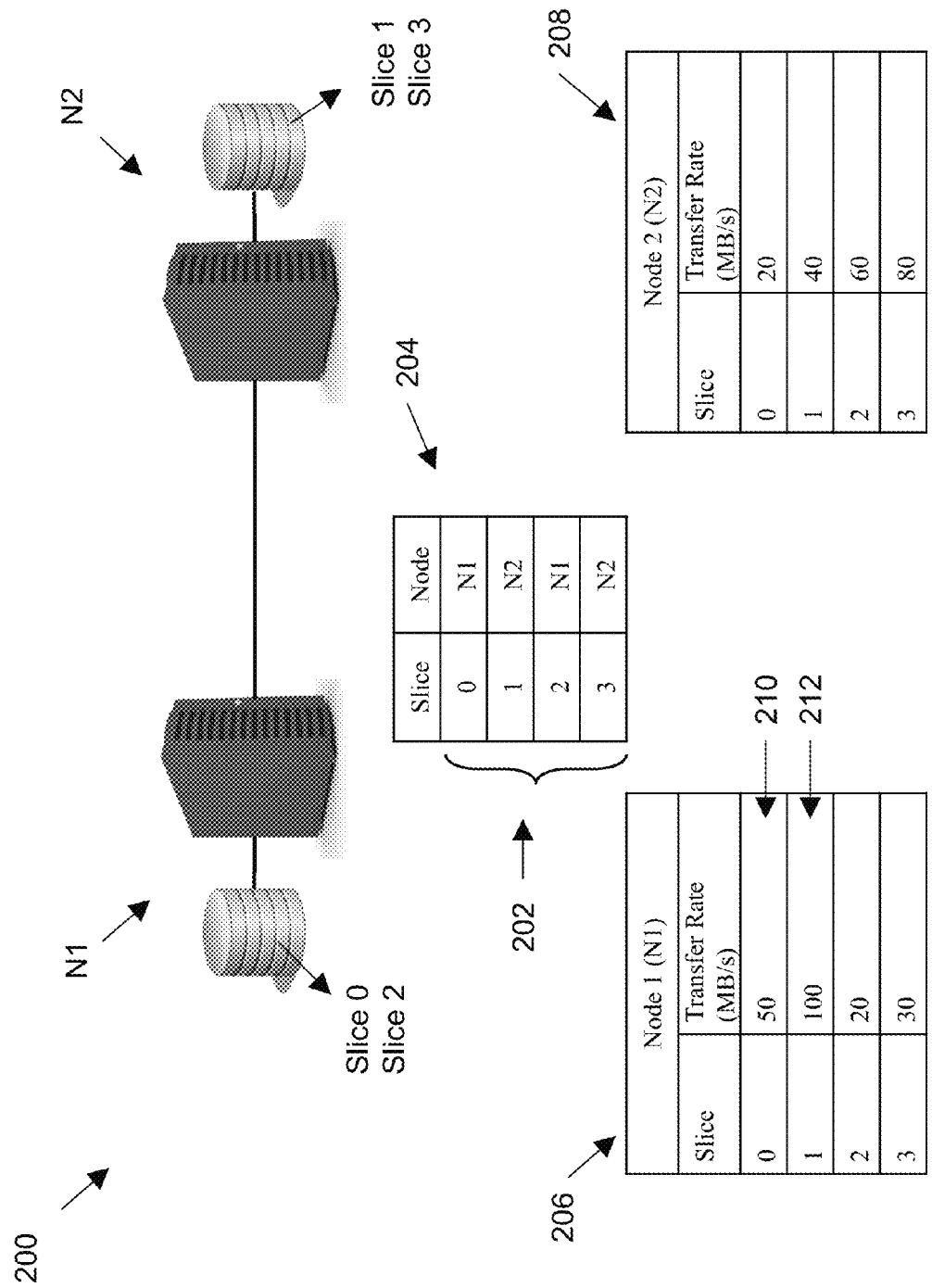
FIG. 2 illustrates an exemplary cluster system, data transfer rates per cluster node, and exemplary slice assignments, according to aspects of the disclosure.
Figure 3:
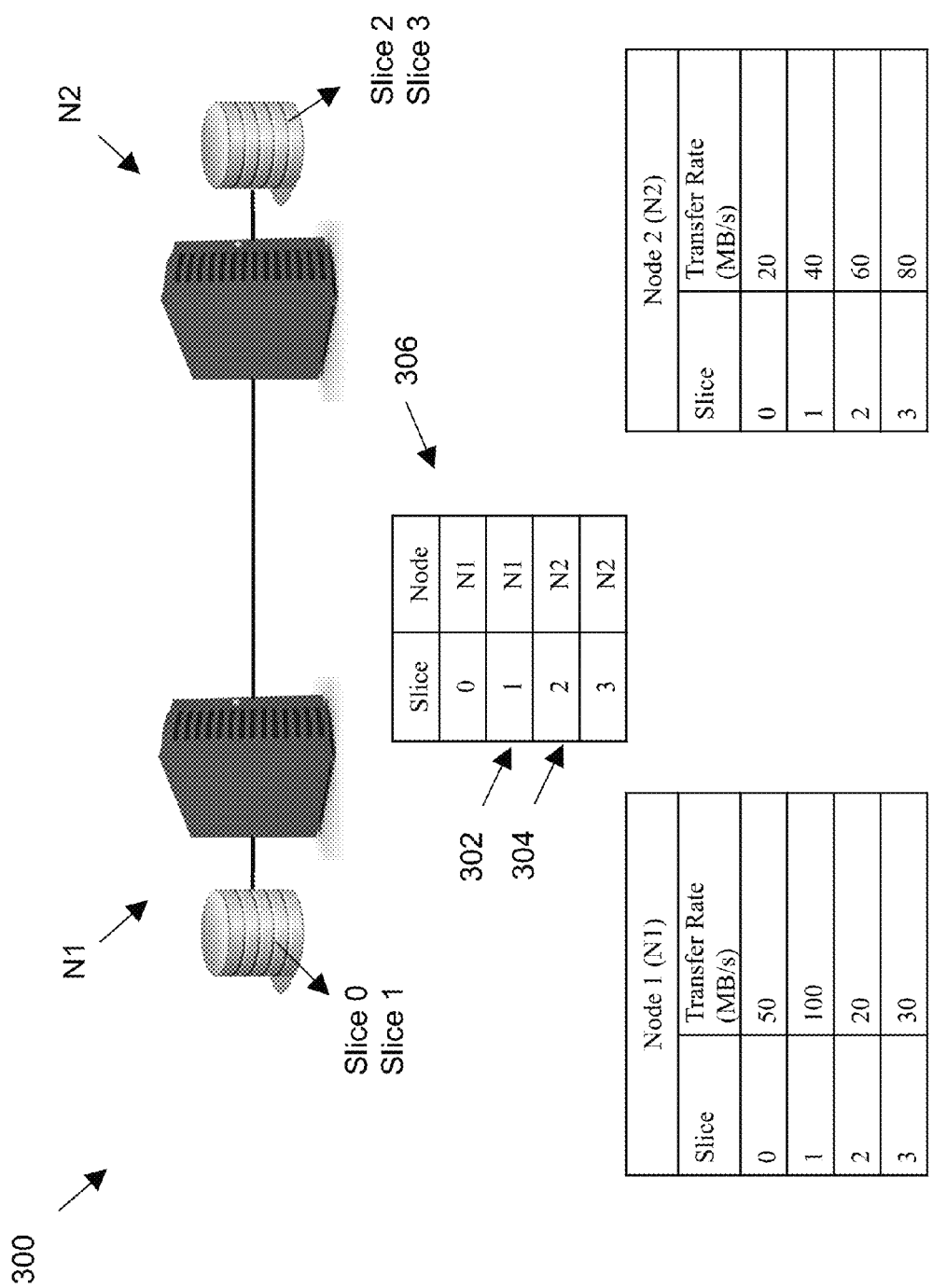
FIG. 3 illustrates an exemplary cluster system, data transfer rates per cluster node, and slice re-assignments, according to aspects of the disclosure.

FIGS. 2 and 3 illustrate an exemplary dynamic allocation of slices and the resulting network utilization reduction. Specifically, FIG. 2 shows a cluster 200 with two nodes (N1, N2). The total cache of the cluster is divided into four slices 202. Initially the slices 202 are assigned between nodes N1 and N2 in a round-robin fashion as illustrated in routing map 204. Specifically, slices {0, 2} are assigned to node N1 and slices {1, 3} are assigned to node N2. Any received requests for data in the slices will be serviced according to routing map 204. For example, a request on node N1 for an LBA that resides in slice 0 will be serviced locally. A request on node N1 for an LBA that resides in slice 1 will be serviced over the network, e.g., by requesting the LBA from node N2. As discussed above, after a pre-determined period, the disclosed systems and methods can determine new owners for the slices, for example, by examining access statistics for the nodes in the cluster. As an illustrative example, Table 206 shows the access statistics for node N1 and Table 208 shows the access statistics for node N2. For example, Table 206 shows that node N1 requests data from slice 0 with a transfer rate of 50 MB/s 210 and requests data from slice 1 with a transfer rate of 100 MB/s 212. As discussed above, only remote requests increase network utilization, which reduces total available network bandwidth, therefore, for node N1, request for data in remote slices, e.g., slices 1 and 3 contribute to the network utilization. Accordingly, for node N2, request for data in remote slices, e.g., slices 0 and 2 contribute to the network utilization. Based on the access statistics in Tables 206 and 208 the remote request rate for node N1 can be calculated based on the following equation:

$$\text{Remote Request Rate } (N1) =$$
$$\text{Transfer Rate Slice 1 + Transfer Rate Slice 3} =$$
$$100 \text{ (Mb/s)} + 30 \text{ (Mb/s)} = 130 \text{ (Mb/s)}$$

Similarly, the remote request rate for node N2 can be calculated based on the following equation:

$$\text{Remote Request Rate } (N2) =$$
$$\text{Transfer Rate Slice 0 + Transfer Rate Slice 2} =$$
$$20 \text{ (Mb/s)} + 60 \text{ (Mb/s)} = 80 \text{ (Mb/s)}$$

The total network utilization is therefore 130 MB/s+80 MB/s=210 MB/s, which is high. According to aspects of the disclosure, based on the remote transfer rates and total network utilization, the slices can be re-assigned to decrease the total network utilization. This is illustrated in FIG. 3. For example, FIG. 3 shows the cluster of FIG. 2, where two of the slices have been re-assigned. Specifically, slice 1, which was previously assigned to node N2, has been re-assigned to node N1 302 and slice 2, which was previously assigned to node N1, has been re-assigned to node N2 304. After all the re-assignments, the new routing map 306 is circulated to all the nodes, so that each node can become aware of the new slice assignments.

After the re-assignments, the remote request rate for node N1 can be calculated based on the following equation:

$$\text{Remote Request Rate } (N1) =$$
$$\text{Transfer Rate Slice 2 + Transfer Rate Slice 3} =$$
$$20 \text{ (Mb/s)} + 30 \text{ (Mb/s)} = 50 \text{ (Mb/s)}$$

Similarly, the remote request rate for node N2 can be calculated based on the following equation:

$$\text{Remote Request Rate } (N2) =$$
$$\text{Transfer Rate Slice 0 + Transfer Rate Slice 1} =$$
$$20 \text{ (Mb/s)} + 40 \text{ (Mb/s)} = 60 \text{ (Mb/s)}$$

The total network utilization is therefore 50 MB/s+60 MB/s=110 MB/s, which is significantly lower, e.g., lower by 52.3% compared to the initial value. Each node in the cluster can maintain a cumulative value of the access size, for example, in bytes, for each slice that it has accessed in a given window of time. The transfer rate for each slice can then be calculated by dividing the access size by the window size. At the time of remapping, for each slice, a re-mapping algorithm can check the transfer rate of each node and can assign it to the node that has the highest transfer rate. In case the current owner of a slice has the largest transfer rate for the particular slice, the slice does not need to be re-mapped. If multiple nodes have the highest transfer rate, ties can be broken using, for example, access size, periodicity of slice ownership switching, cache pollution and other heuristics. The original and new network utilization can be calculated by the summation of transfer rates for each slice by remote nodes. The statistics can be reset after a round of re-mapping.

The frequency of re-mapping can be determined by an administrator. For example, it can run at a particular time during the day, e.g., when request traffic is low. The re-mapping can also be automatic, for example, a process in the background can periodically poll the transfer rates from each node and determine if there is a change from the steady state, e.g., due to change in application access patterns.

According to alternative aspects of the invention, other heuristics can be used to determine an improved slice placement, such as cache space utilization on a node, eviction and amount of dirty data that would need to be migrated after ownership change. Each node can track the amount of dirty data that can be flushed. Re-mapping of a slice can be avoided it would mean flushing dirty data above a threshold. Flushing massive amounts of data by different nodes during re-mapping can create random writes to the disk and therefore can impact the time to perform re-mapping and also have an impact on application I/Os that need to fetch data from the disk on a cache miss. Cache utilization can also be considered because a node can be the optimal owner for a slice, e.g., based on transfer rate, but that does not mean that storing that slice on its optimal owner would improve performance. For each node, priorities can be assigned to those slices based on transfer rates. These priorities along with cache utilization can be used during re-mapping to determine if a particular slice should be re-mapped to a given node or not. If cache utilization is low then re-mapping can occur; otherwise mapping a low priority slice can cause data from other higher priority slices to be evicted, which may negatively impact performance.

After a new routing map has been created, it is desirable to dynamically update the routing maps in each cluster, e.g., without any downtime, without deleting or recreating the cluster, or pausing the processing of data requests for long duration.

According to aspects of the disclosure, the new routing map can be updated atomically across all nodes in the cluster. For example, one of the nodes can be assigned to be the manager node that can be responsible for coordinating the update. The manager node can provide the new routing map to all other nodes of the cluster and can request them to start the update process. According to aspects of the disclosure, the update process can include three steps. During the first step, all nodes can individually compare the new routing map with the current routing map and can determine which slices were re-assigned to them, e.g., gained slices, and which slices are no longer assigned to them, e.g., lost slices.

Current slice owners can fetch the data from the backend on a cache miss. During remapping, if the old owner did not flush all the dirty data and treated all subsequent writes as write-through, then the new owner could end up fetching stale data from the backend (after the remote-hit period is over). For all lost slice ownerships, the nodes can flush any dirty data they have in cache for those slices and can also make those slices write-through. Therefore, after being flushed, any new writes will not make the slice dirty again. This can ensure consistency with the backend (cached device) so that in case of any error, there can be no dependency on the old owner of a slice.

For all gained slice ownerships, the nodes can delete any pre-existing data that are present in the cache. This action is performed because, as explained above, the process for lost slice ownerships flushes the dirty data without deleting data that belong to slices for which the node has lost ownership. This action does not create any problems as the data that belongs to a slice for which ownership was lost, will eventually get evicted from the cache as new data is cached. For example, if a slice was re-mapped to a new owner, the old owner can flush any dirty data associated with the slice before the ownership change. During a remote-hit period after the ownership change, the new owner can query the old owner for data on a cache miss, because it can be faster to get the data from the old owner, instead of getting it from the backend. This is generally true because network and solid state drive accesses are faster than hard disk drive accesses. Caching on demand after ownership change can also avoid cache pollution because not all blocks of the slice that were cached in the old owner will be needed by the new owner. The remote-hit period can be for a finite duration and can be intended for warming up the cache of the new owner. For a read request on a block, the new owner can query the old owner for the block and can cache it. If the old owner does not have the block, the new owner can fetch it from the backend. A write request at a later time can modify the block, which would make the copy of the block on the old owner to be stale. If during a new round of re-mapping the slice is re-mapped to its old owner, if the old owner still had the block in its cache, then for a read request it would return stale data. This is the reason for pre-cleaning any existing data that a node might have for a slice for which it is gaining ownership.

After completing this step, each node can inform the manager node about the status of completion of the step, e.g., whether the node has successfully flushed the dirty data and deleted any pre-existing data or whether there was an error in this step. According to aspects of the disclosure, if all nodes have indicated that they have successfully completed the step, the manager node can instruct all the nodes to move to the second step of the update process. If at least one node has indicated that there was an error during the first step, the manager node can instruct all nodes to abort the update process.

At the second step the manager node can instruct all nodes to individually pause servicing their requests, e.g., the received requests can be held in a queue, and to apply the new routing map. After completing this step, each node can inform the manager node about the status of completion of the step, e.g., whether they have successfully applied the new map or whether there was an error in this step. If all the nodes indicate that the step was successful, the manager node can instruct all nodes to move to the third step of the update process. If at least one node has indicated that there was an error during the first step, the manager node can instruct all nodes to abort the update process. When the nodes receive the abort instruction, the nodes can discard the new routing map and can resume processing of their requests according to the previous routing map. According to alternative aspects of the disclosure, the manager node can retry the protocol from the beginning after some time. At the third step of the update process, all nodes can resume servicing their requests.

Figure 4:
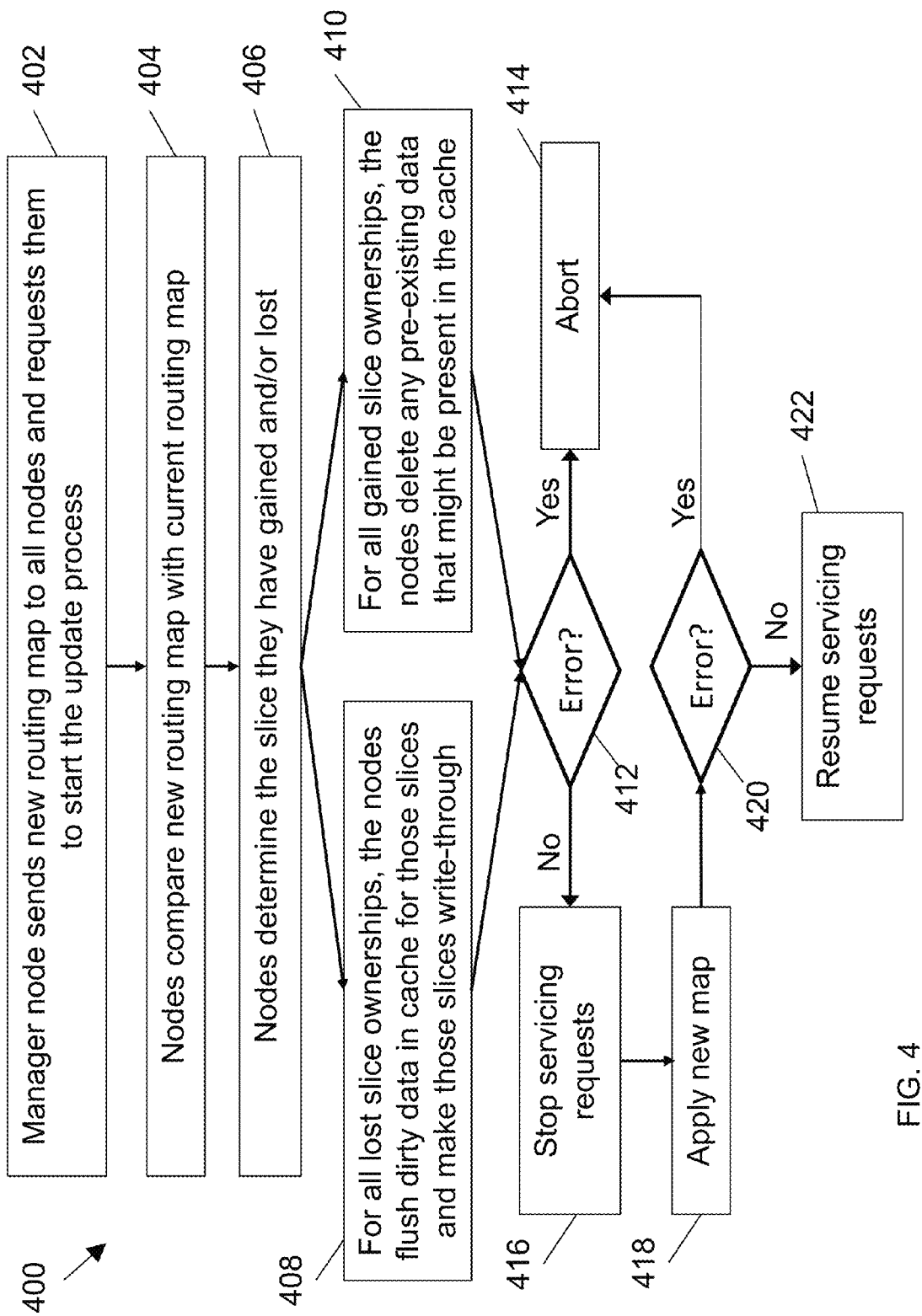
FIG. 4 illustrates an exemplary method for updating routing maps in a cluster system, according to aspects of the disclosure.

FIG. 4 shows an exemplary method 400 for updating the routing map according to aspects of the disclosure. Specifically, the manager node can send the new routing map to all nodes and can request them to start the update process 402. Once the nodes receive the new routing map, the nodes can compare the new routing map with the current routing map 404. The nodes can then determine the slices they have gained and/or lost 406. For all lost slice ownerships, the nodes flush dirty data in cache for those slices and make those slices write-through 408. For all gained slice ownerships, the nodes delete any pre-existing data that might be present in the cache 410. If an error occurs at any of the nodes 412, then the manager node can abort the process 414. If no error occurs, the nodes can stop servicing their requests 416 and apply the new routing map 418. If an error occurs at any of the nodes 420, then the manager node can abort the process 414. If no error occurs, then the nodes can resume servicing the requests.

After updating the routing map across all the nodes, the new ownership of slices is in effect. However the new owners do not contain any data for the slices that they gained after the just-concluded round of ownership update. This does not pose any data consistency challenges because before the ownership change, all dirty data that belong to the slices whose ownership has changed is flushed and therefore, the new owner can always fetch the data from the backend to service any request. This can increase the latency, however, because the cache needs to be re-warmed, which can lead to a saw-tooth type performance characteristics after each round of ownership change.

The disclosed systems and methods can mitigate this problem. According to aspects of the disclosure, the data can be transferred to the new owner instead of being flushed to the backend, before the ownership change. According to alternative aspects of the disclosure, the data can be transferred in the background from the old owner node to the new owner node, after the ownership change.

These solutions can potentially lead to cache pollution as not all data that has been cached for a particular slice might be frequently accessed. For example, only a subset of the slice can be frequently accessed and the remainder is accessed infrequently thereby rendering it not hot enough to be cached. For such scenarios, transferring all the cached data for a particular slice from the old owner node to the new owner node can lead to eviction of some more frequently accessed data from the new owner.

According to aspects of the disclosure, caching data on demand can ameliorate the saw-tooth performance and also avoid cache pollution. Caching data on demand is a time-bound process, called remote-hit period. By consulting the new and old routing map, the disclosed method can determine the current and old owners of a slice. For any request, if the new owner does not have the data, the disclosed method can consult the old owner and can check if it still has the data in its cache. This assumes that during the process of updating the routing map, the data for a lost slice is not deleted. The data can be flushed so it is clean in the cache and can be eventually evicted according to cache garbage collection policies.

According to aspects of the disclosure, if the old owner still has the data, the request can be serviced. The data is also cached and pinned in the new owner. Therefore, data can migrate on-demand from the old owner to the new owner, which avoids cache pollution. In addition, fetching the data from the old owner can be faster than fetching the data from the backend, and therefore, the saw-tooth performance can be ameliorated. The data needs to be pinned on the new owner because it could be modified causing the old owner to have stale data. This can prevent eviction of data on the new owner belonging to a newly gained slice during the remote-hit period. If the old owner does not have the data in its cache, then the data can be fetched from the backend and can be cached and pinned in the new owner.

After the remote-hit period is over, the old owner is no longer consulted for any cache misses and the data can be unpinned on the new owner. The duration of the remote-hit period can be determined using various heuristics, for example, based on historical times for warming the cache.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods for the communications protocol can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this communications protocol can be embodied in other specific forms without departing from the spirit or essential attributes thereof, and accordingly, reference should be had to the following claims, rather than to the foregoing specification, as indicating the scope of the invention.

The communications protocol has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A method for adaptive partitioning of a distributed cache in a cluster comprising a plurality of computer nodes interconnected by a network, the distributed cache partitioned in cache slices, the method comprising:
   assigning a first plurality of the cache slices to a first computer node based on a first routing table;
   re-assigning, after a first period of time, based on access statistics for the cache slices of the computer nodes, a second plurality of the cache slices to the first computer node and a first subset of the first plurality of the cache slices to at least one computer node other than the first computer node; and
   providing a second routing table according to the re-assigning of the cache slices to the computer nodes after the first period of time.

2. The method of claim 1, wherein the access statistics comprise transfer rates for the cache slices that are based on the access size for each of the cache slices and a period of time.

3. The method of claim 1, wherein the re-assigning of the second plurality of the cache slices and the first subset of the first plurality of the cache slices results in reduced network utilization.

4. The method of claim 1, further comprising comparing the first routing table and the second routing table to determine the second plurality of the cache slices and the first subset of the first plurality of the cache slices.

5. The method of claim 4, further comprising:
   (a) flushing dirty data from the first subset of the first plurality of the cache slices;
   (b) making the first subset of the first plurality of the cache slices write-through cache slices; and
   (c) deleting pre-existing data from the second plurality of the cache slices.

6. The method of claim 5, further comprising determining whether a first error has occurred during at least one of (a), (b), and (c).

7. The method of claim 6, further comprising re-assigning the first plurality of the cache slices to the first computer node based on the first routing table, if the first error has occurred.

8. The method of claim 6, further comprising stopping, at the first computer node, servicing data requests, if the first error has not occurred.

9. The method of claim 8, further comprising determining, at the first computer node, destinations of data requests based on the second routing table.

10. The method of claim 9, further comprising determining whether a second error has occurred during the determining of the destinations of data requests based on the second routing table.

11. The method of claim 10, further comprising re-assigning the first plurality of the cache slices to the first computer node based on the first routing table, if the second error has occurred.

12. The method of claim 11, further comprising resuming at the first computer node, servicing data requests, if the first error has not occurred.

13. A system for adaptive partitioning of a distributed cache in a cluster comprising a plurality of computer nodes interconnected by a network, the system comprising:
   the distributed cache partitioned in cache slices; and
   a first computer node configured to:
   assign a first plurality of the cache slices to the first computer node based on a first routing table;
   re-assign, after a first period of time, based on access statistics for the cache slices of the computer nodes, a second plurality of the cache slices to the first computer node and a first subset of the first plurality of the cache slices to at least one computer node other than the first computer node; and
   provide a second routing table according to the re-assigning of the cache slices to the computer nodes after the first period of time.

14. The system of claim 13, wherein the access statistics comprise transfer rates for the cache slices that are based on the access size for each of the cache slices and a period of time.

15. The system of claim 13, wherein the re-assigning of the second plurality of the cache slices and the first subset of the first plurality of the cache slices results in reduced network utilization.

16. The system of claim 13, wherein the first computer node is further configured to compare the first routing table and the second routing table to determine the second plurality of the cache slices and the first subset of the first plurality of the cache slices.

17. The system of claim 16, wherein the first computer node is further configured to:
   (a) flush dirty data from the first subset of the first plurality of the cache slices;
   (b) make the first subset of the first plurality of the cache slices write-through cache slices; and
   (c) delete pre-existing data from the second plurality of the cache slices.

18. The system of claim 17, wherein the first computer node is further configured to determine whether a first error has occurred during at least one of (a), (b), and (c).

19. The system of claim 18, wherein the first computer node is further configured to re-assign the first plurality of the cache slices to the first computer node based on the first routing table, if the first error has occurred.

20. The system of claim 18, wherein the first computer node is further configured to stop servicing data requests, if the first error has not occurred.

21. The system of claim 20, wherein the first computer node is further configured to determine destinations of data requests based on the second routing table.

22. The system of claim 21, wherein the first computer node is further configured to determine whether a second error has occurred during the determining of the destinations of data requests based on the second routing table.

23. The system of claim 22, wherein the first computer node is further configured to re-assign the first plurality of the cache slices to the first computer node based on the first routing table, if the second error has occurred.

24. The system of claim 23, wherein the first computer node is further configured to resume servicing data requests, if the first error has not occurred.

* * * * *